Oct. 13, 1931.     E. H. POWERS     1,826,821
SWIVEL CASTER
Filed Jan. 17, 1930
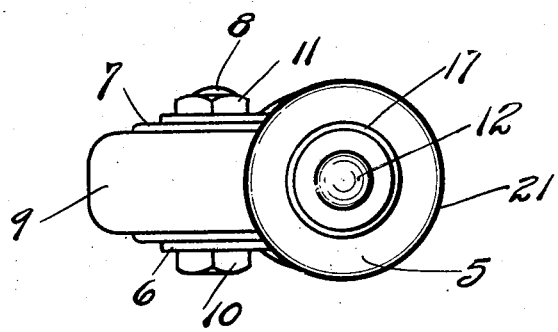
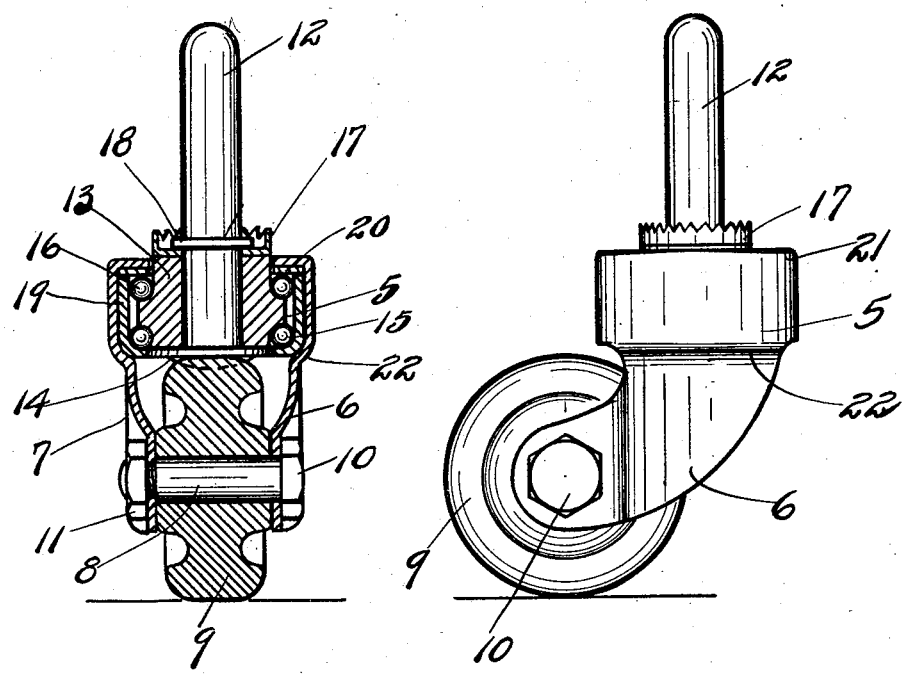
INVENTOR.
Edwin H. Powers.
BY Frank C. Kauman,
ATTORNEY.

Patented Oct. 13, 1931

1,826,821

UNITED STATES PATENT OFFICE

EDWIN H. POWERS, OF SAGINAW, MICHIGAN, ASSIGNOR TO SAGINAW STAMPING AND TOOL COMPANY, OF SAGINAW, MICHIGAN, A CORPORATION OF MICHIGAN

SWIVEL CASTER

Application filed January 17, 1930. Serial No. 421,353.

This invention relates to casters, and more particularly to swivel casters of new and pleasing appearance for use on hospital equipment, furniture, and in fact on any article where it is desired to move smoothly, easily and with a minimum of friction.

One object of the invention is to provide a ball bearing caster which has a free and easy swiveling action, and in which the wearing parts are formed of stampings, suitably hardened and carbonized to insure long life with a minimum of wear.

Another object of the invention is to provide a stamped swivel caster which can be economically manufactured and assembled, which is smooth and noiseless in operation, and which will not mar the finish of the floor or surface over which it operates.

A further object is to design a sturdy and substantial swivel caster which is provided with a double row of anti-friction balls, so that friction and side pressure is eliminated during movement.

The above and other objects will appear as the specification progresses, reference being had to the accompanying drawings in which I have shown the preferred embodiment of my invention, and in which like reference numerals indicate like parts throughout the several views thereof.

In the drawings:

Fig. 1 is a side view of my improved swivel caster.

Fig. 2 is a vertical sectional view thereof.

Fig. 3 is a top plan view.

Referring now to the drawings, the numeral 5 indicates a wheel yoke formed of a stamping and provided with a pair of off-set forked legs 6 and 7 respectively, having suitable openings in the ends thereof to accommodate an axle member 8, and on which a hard rubber wheel 9 is mounted, said axle having a head 10 on the one end thereof, the opposite end being shouldered and threaded, and a nut 11 is threaded thereon in the usual manner.

A stem 12 projects from the upper end of the caster, the lower end being anchored in center core 13, and is provided with a head 14 as usual, said core being suitably formed to accommodate spaced apart rows of antifriction balls 15 and 16 respectively, the upper end of said core being of smaller diameter, and a cup 17 is mounted thereon, the upper edge of the cup being serrated as shown, and a washer 18 is shrunk on the shaft to hold it in proper position.

A hardened and carbonized shell 19 embraces said core and balls, the lower end being rounded to conform to the curvature of the lower row of anti-friction balls, and has a centrally disposed opening to accommodate the head of the stem, the upper end of the shell being open, and a washer member 20 forms a closure for the shell and embraces the upper end of the core.

The upper end 21 of the wheel yoke is cylindrical in shape, and fits over the washer 20, this is also provided with an opening to accommodate the core, the lower end being pressed in and constricted as shown at 22 to support the shell 19, thence terminating in the forked legs as above described, the axle opening in the leg 7 being of smaller diameter than the opening in the leg 6, so that it will fit the shouldered end of the axle 8, eliminating any possibility of binding the wheel between the legs when the nut 11 is tightened.

This construction provides a well balanced and easy running swivel caster as the lower row of balls 15 takes the vertical load on the caster, and the upper row 16 takes the lateral or side thrust.

From the foregoing description it will be obvious that I have perfected a very simple, practical caster, of neat and pleasing appearance, which will not mar the floor finish, and which is smooth and velvety in operation.

What I claim is:—

1. In a swivel caster, a stamped yoke having a wheel mounted therein, a center core provided with a vertically disposed stem, a stamped shell mounted in said yoke, anti-friction balls interposed between said core and shell, the lower end of said yoke being constricted to form a bearing and support for said shell and core.

2. In a swivel caster, a wheel yoke having a wheel mounted therein, a center core having a vertically disposed stem anchored thereto, vertically spaced raceways formed in said core, a cup shaped shell, anti-friction balls interposed between said shell and core, said yoke embracing said shell and having its upper end pressed inwardly to cover the open end of the shell and balls, the lower end being constricted to form a bearing and support for the shell and core.

3. In a swivel caster, a wheel yoke and a wheel mounted therein, a center core, a stem anchored therein, raceways formed in said core, a shell, spaced apart rows of anti-friction balls interposed between said core and shell, the upper end of said wheel yoke embracing and having its lower end pressed inwardly to form a bearing for said shell and core.

4. In a swivel caster, a wheel yoke having a wheel mounted therein, a center core, a vertically disposed stem projecting therefrom, spaced apart raceways formed in said core, a cup shaped shell, rows of anti-friction balls interposed between said core and shell, a washer fitted over the upper end of the core and forming a closure for the upper end of the shell and upper ball row, the upper end of the yoke embracing said shell and washer, the lower end being constricted to form a support and bearing for the shell and core.

5. In a swivel caster, a yoke having a wheel mounted therein, a center core, a vertically extending stem anchored therein, spaced apart raceways provided in the core, anti-friction balls mounted therein, a shell surrounding said balls, its lower end conforming to the radius of the lower row of balls, a washer fitted over said core and forming a closure for the shell and the upper row of balls, said yoke embracing said shell and having its upper end pressed inwardly over the washer, the lower end being constricted to support said shell therein.

In testimony whereof I hereunto affix my signature.

EDWIN H. POWERS.